United States Patent
Yang

(10) Patent No.: US 8,564,940 B2
(45) Date of Patent: Oct. 22, 2013

(54) KEYBOARD MECHANISM FOR A PORTABLE ELECTRONIC DEVICE AND RELATED PORTABLE ELECTRONIC DEVICE

(75) Inventor: Chun-Fei Yang, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 295 days.

(21) Appl. No.: 12/857,482

(22) Filed: Aug. 16, 2010

(65) Prior Publication Data

US 2011/0043985 A1 Feb. 24, 2011

(30) Foreign Application Priority Data

Aug. 24, 2009 (TW) .............................. 98128372 A

(51) Int. Cl.
*H05K 7/14* (2006.01)
(52) U.S. Cl.
USPC ................................. 361/679.08; 361/679.02
(58) Field of Classification Search
USPC ............ 361/679.08, 679.01, 679.02, 679.09, 361/679.21, 679.26, 679.27; 341/22–33; 345/168–172; 400/472–496; 248/917–924
See application file for complete search history.

(56) References Cited

U.S. PATENT DOCUMENTS

| | | | | |
|---|---|---|---|---|
| 6,751,089 | B2 * | 6/2004 | Hsieh ........................ | 361/679.09 |
| 7,733,636 | B2 * | 6/2010 | Kobayashi et al. ...... | 361/679.08 |
| 7,755,883 | B2 * | 7/2010 | Hsu et al. ................. | 361/679.17 |
| 2004/0190233 | A1 * | 9/2004 | Yu et al. ........................ | 361/680 |

FOREIGN PATENT DOCUMENTS

| | | |
|---|---|---|
| CN | 101464732 A | 6/2009 |
| TW | 312360 | 8/1997 |
| TW | M253810 | 12/2004 |
| TW | M255456 | 1/2005 |
| TW | M279964 | 11/2005 |

OTHER PUBLICATIONS

Office action mailed on Apr. 5, 2012 for the Taiwan application No. 098128372, p. 2 line 4-26, p. 3, p. 4 line 1-5.
Office action mailed on Nov. 24, 2011 for the China application No. 200910169660.1, p. 3 line 5-18.

* cited by examiner

*Primary Examiner* — Jinhee Lee
*Assistant Examiner* — Ingrid Wright
(74) *Attorney, Agent, or Firm* — Winston Hsu; Scott Margo

(57) ABSTRACT

A keyboard mechanism includes a keyboard, a first engaging part, a support frame, and a second engaging part. The first engaging part is disposed on the keyboard. The support frame is installed on a case of a portable electronic device. The support frame is used for supporting the keyboard on the case of the portable electronic device. An opening is formed on the support frame. The location of the opening corresponds to the location of the first engaging part. The second engaging part is used for engaging with the first engaging part when the first engaging part is disposed through the opening of the support frame, so that the keyboard is installed on the support frame.

16 Claims, 9 Drawing Sheets

KEYBOARD MECHANISM FOR A PORTABLE ELECTRONIC DEVICE AND RELATED PORTABLE ELECTRONIC DEVICE

BACKGROUND OF THE INVENTION

1. Field of the Invention

The present invention relates to a keyboard mechanism and a related device, and more specifically, to a keyboard mechanism for a portable electronic device and a related portable electronic device.

2. Description of the Prior Art

In general, installation of a keyboard on a portable electronic device (e.g. a notebook) usually utilizes a screw-locking method commonly used in the prior art, such as screwing a bottom case of the portable electronic device into screw bosses located at the bottom of the keyboard. As a result, the keyboard can be fixed to the portable electronic device firmly and can be supported by the screw bosses.

However, there are some drawbacks in the said method. First, since the said method only utilizes several screw bosses to support the keyboard, floating of the keyboard may occur when a user presses one button which is not located above the screw bosses, so as to make the user feel uncomfortable while typing the keyboard. Furthermore, for preventing the screw bosses from interfering with other components inside the portable electronic device, arrangement of the screw bosses on the bottom of the keyboard may vary with the structural design of the portable electronic device, so as to cause the structural design of the keyboard more complicated. The said method may also result in a time-consuming and strenuous assembly process.

In summary, how to improve the said drawbacks and simplify an assembly process of a keyboard should be a concern in manufacturing a portable electronic device.

SUMMARY OF THE INVENTION

The present invention provides a keyboard mechanism for a portable electronic device, the keyboard mechanism comprising a keyboard; a first engaging part disposed on the keyboard; a support frame installed on a case of the portable electronic device for supporting the keyboard on the case of the portable electronic device, an opening being located at a position on the support frame corresponding to the first engaging part; and a second engaging part for engaging with the first engaging part so as to install the keyboard on the support frame when the first engaging part is disposed through the opening of the support frame.

The present invention further provides a portable electronic device capable of supporting a keyboard, the portable electronic device comprising a main body; a case disposed on the main body; and a keyboard mechanism installed on the case, the keyboard mechanism comprising a keyboard; a first engaging part disposed on the keyboard; a support frame installed on a case of the portable electronic device for supporting the keyboard on the case of the portable electronic device, an opening being located at a position on the support frame corresponding to the first engaging part; and a second engaging part for engaging with the first engaging part so as to install the keyboard on the support frame when the first engaging part is disposed through the opening of the support frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
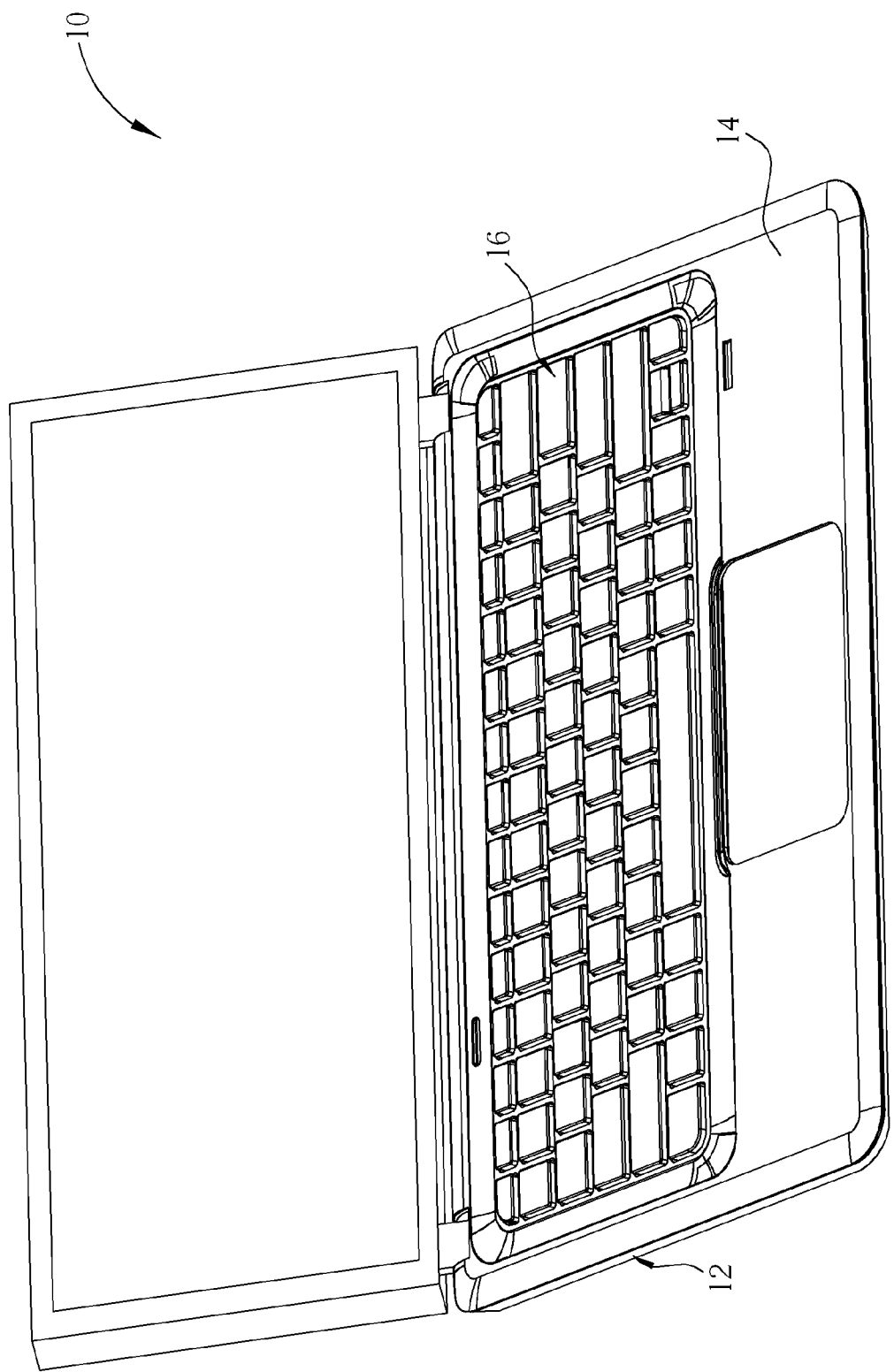
FIG. 1 is a diagram of a portable electronic device according to a first preferred embodiment of the present invention.
Figure 2:
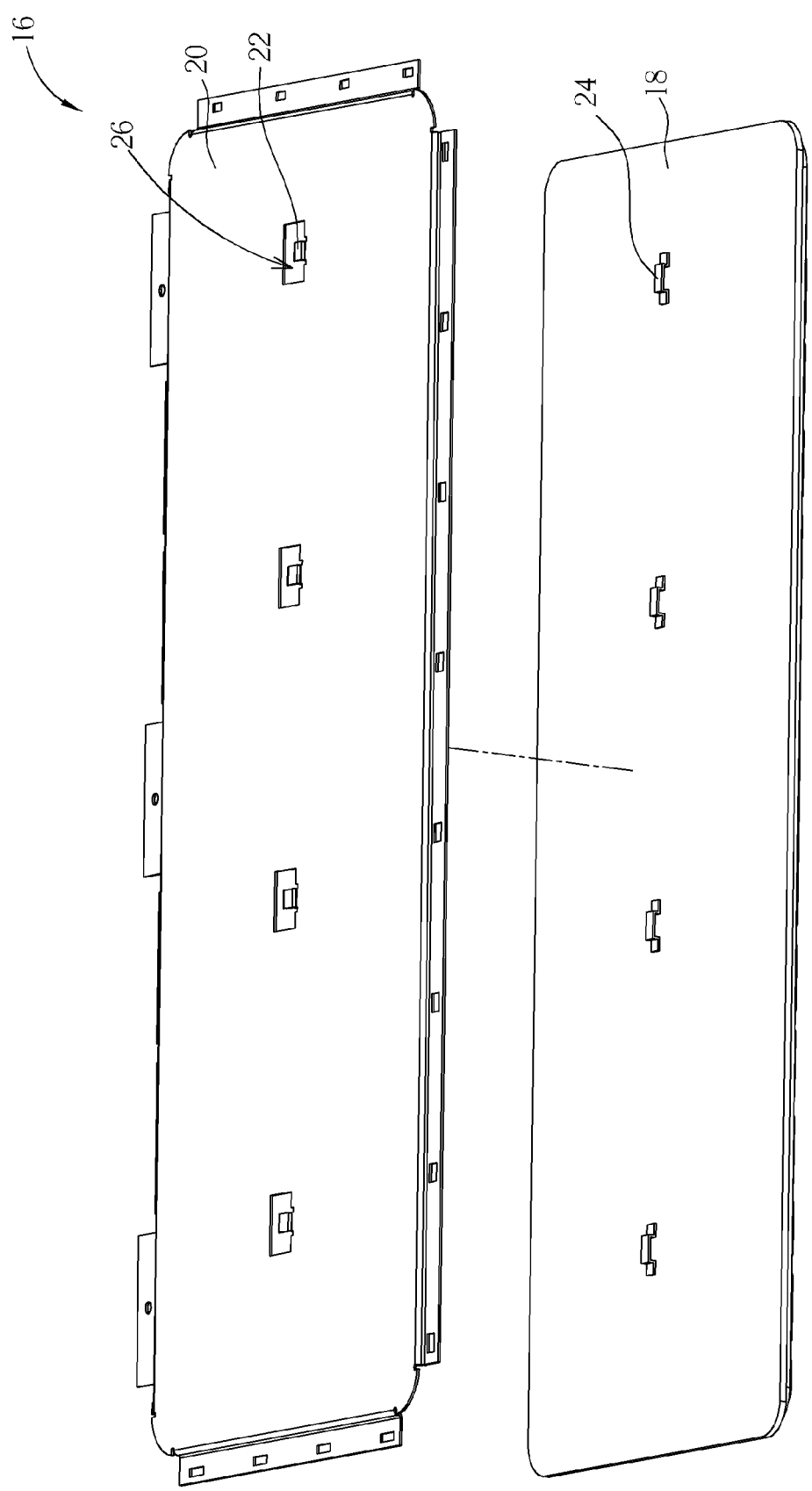
FIG. 2 is an exploded diagram of a keyboard mechanism in FIG. 1.

Please refer to FIG. 1, which is a diagram of a portable electronic device 10 according to a first preferred embodiment of the present invention. In the present invention, the portable electronic device 10 may preferably be a notebook, but is not limited thereto. That is to say, the portable electronic device 10 may also be other electronic device having a built-in keyboard, such as a personal digital assistant (PDA), a smart phone, and so on. As shown in FIG. 1, the portable electronic device 10 includes a main body 12, a case 14, and a keyboard mechanism 16. The main body 12 may be other components besides the case 14 and the keyboard 16 on the portable electronic device 10, such as a motherboard and a monitor. The case 14 is installed on the main body 12. The keyboard mechanism 16 is installed on the case 14. Next, please refer to FIG. 2, which is an exploded diagram of the keyboard mechanism 16 in FIG. 1. As shown in FIG. 2, the keyboard mechanism 16 includes a keyboard 18, a support frame 20, at least one second engaging part 22 (four shown in FIG. 2), and at least one first engaging part 24 (four shown in FIG. 2) corresponding to the second engaging part 22. The first engaging part 24 is disposed at the bottom of the keyboard 18. In the present invention, the first engaging part 24 is preferably a protruding hollow structure. The support frame 20 is installed on the case 14 and is preferably made of metal material. The support frame 20 is used for supporting the keyboard 18 on the case 14. At least one opening 26 (four shown in FIG. 2) is formed on the support frame 20. The opening 26 is disposed at a position on the support frame 20 corresponding to the first engaging part 24. The second engaging part 22 is formed on the opening 26 of the support frame 20. The second engaging part 22 is used for engaging with the first engaging part 24 when the first engaging part 24 is disposed through the opening 26, so as to install the keyboard on the support frame 20. Number and arrangement of the first engaging parts 24, the second engaging parts 22, and the openings 26 as mentioned above is not limited to the said embodiment and may vary with manufacturing needs of the keyboard mechanism 16. Furthermore, besides being formed integrally with the keyboard 18, the first engaging part 24 may also be an independently-formed component which is detachably disposed on the bottom of the keyboard 18 by a common connection method (i.e. a screw-locking method).

Figure 3:
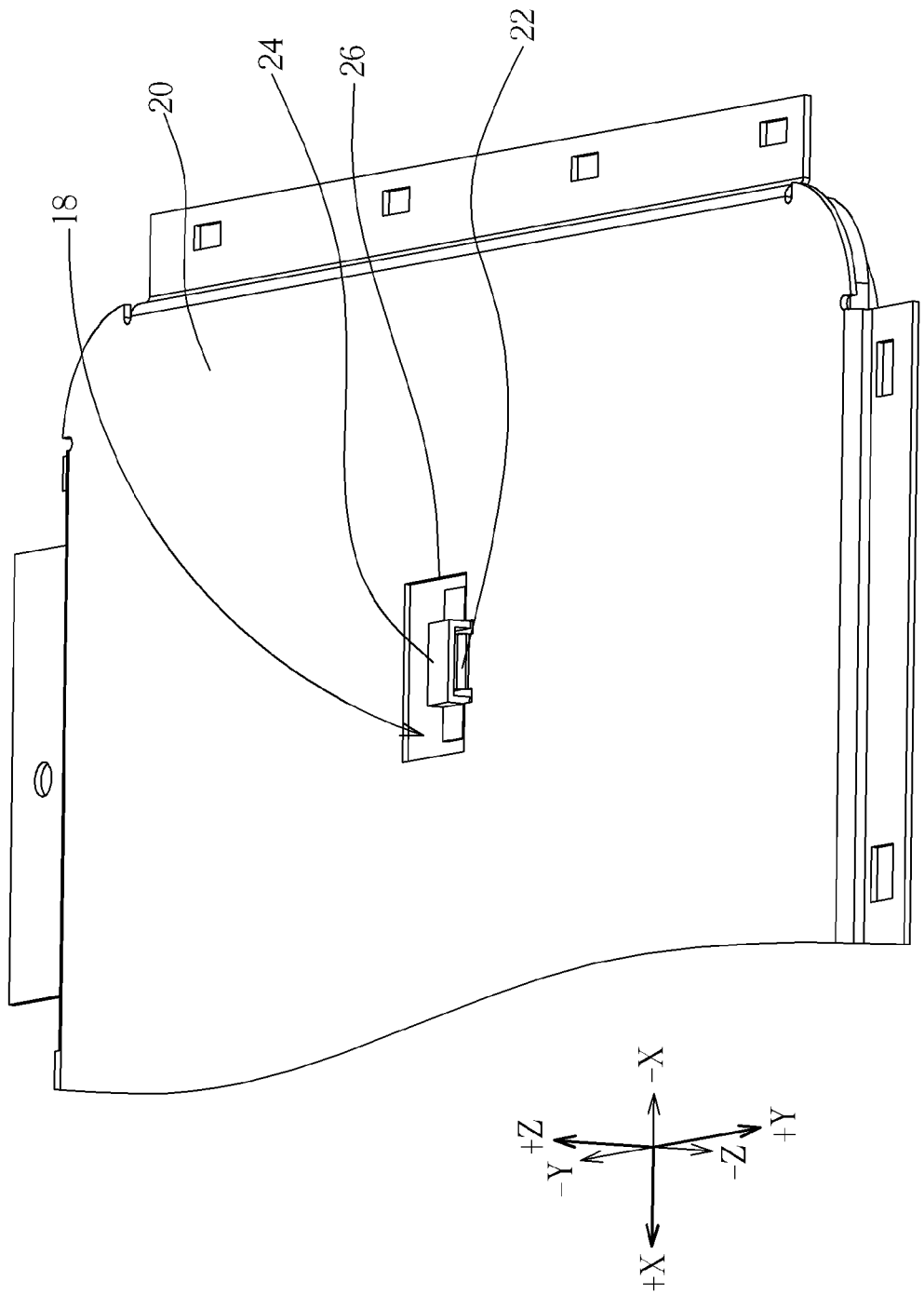
FIG. 3 is an assembly diagram of a keyboard in FIG. 2 being installed on a support frame.

More detailed description for assembly of the portable electronic device 10 is provided as follows. Please refer to FIG. 2 and FIG. 3. FIG. 3 is an assembly diagram of the keyboard 18 in FIG. 2 being installed on the support frame 20. The first step is to align the first engaging part 24 disposed on the keyboard 18 as shown in FIG. 2 with the opening 26 on the support frame 20 and then dispose the first engaging part 24 inside the opening 26. The subsequent step is to push the keyboard 18 to move toward the second engaging part 22 relative to the support frame 20 until the second engaging part 22 passes through the first engaging part 24, so as to install the keyboard 18 on the support frame 20 as shown in FIG. 3. At this time, motion of the keyboard 18 toward ±X-axis, ±Z-axis, and +Y-axis is constrained by engagement of the first engaging part 24 and the second engaging part 22.

Figure 4:
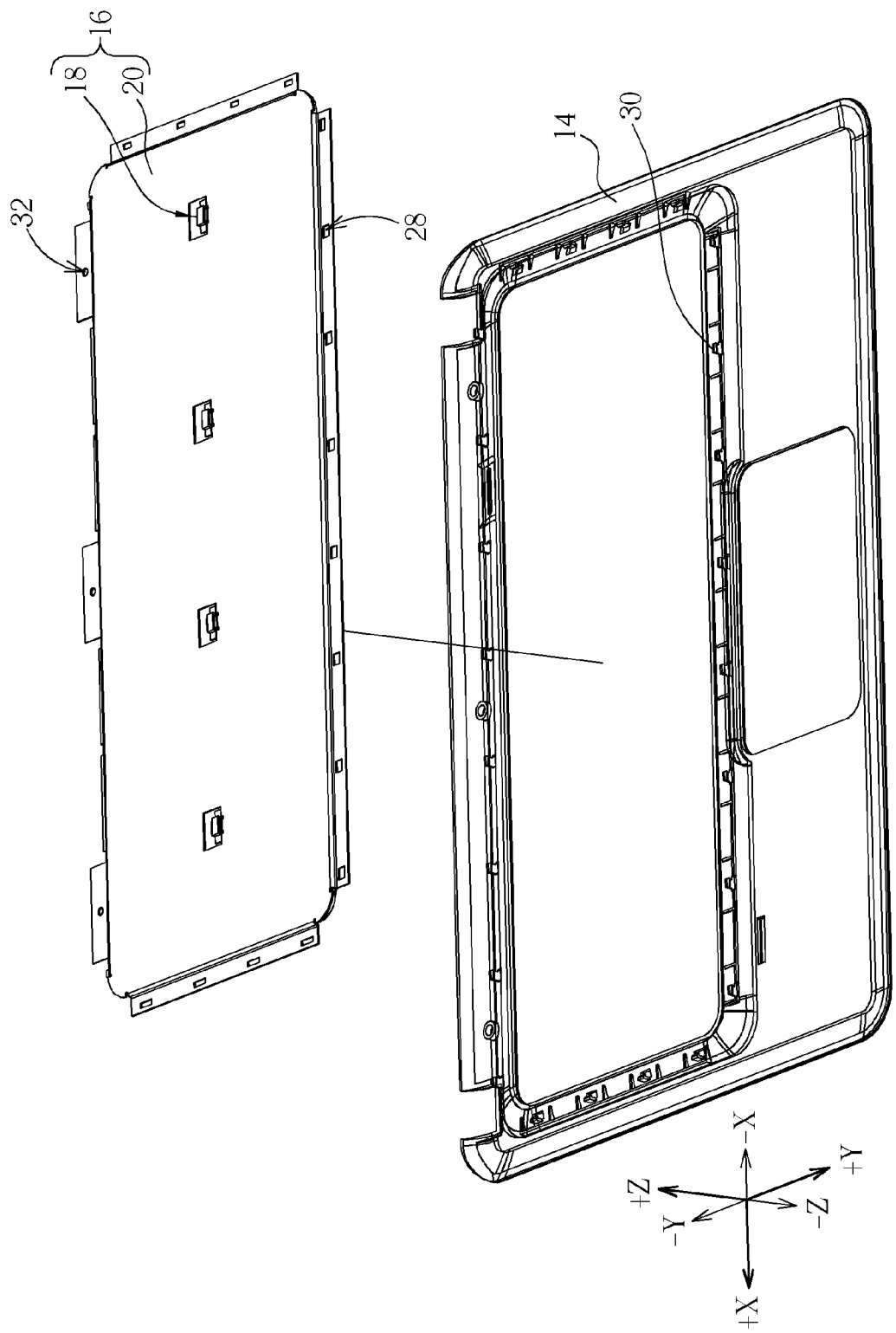
FIG. 4 is an exploded diagram of the support frame installed with the keyboard in FIG. 3 and a case.
Figure 5:
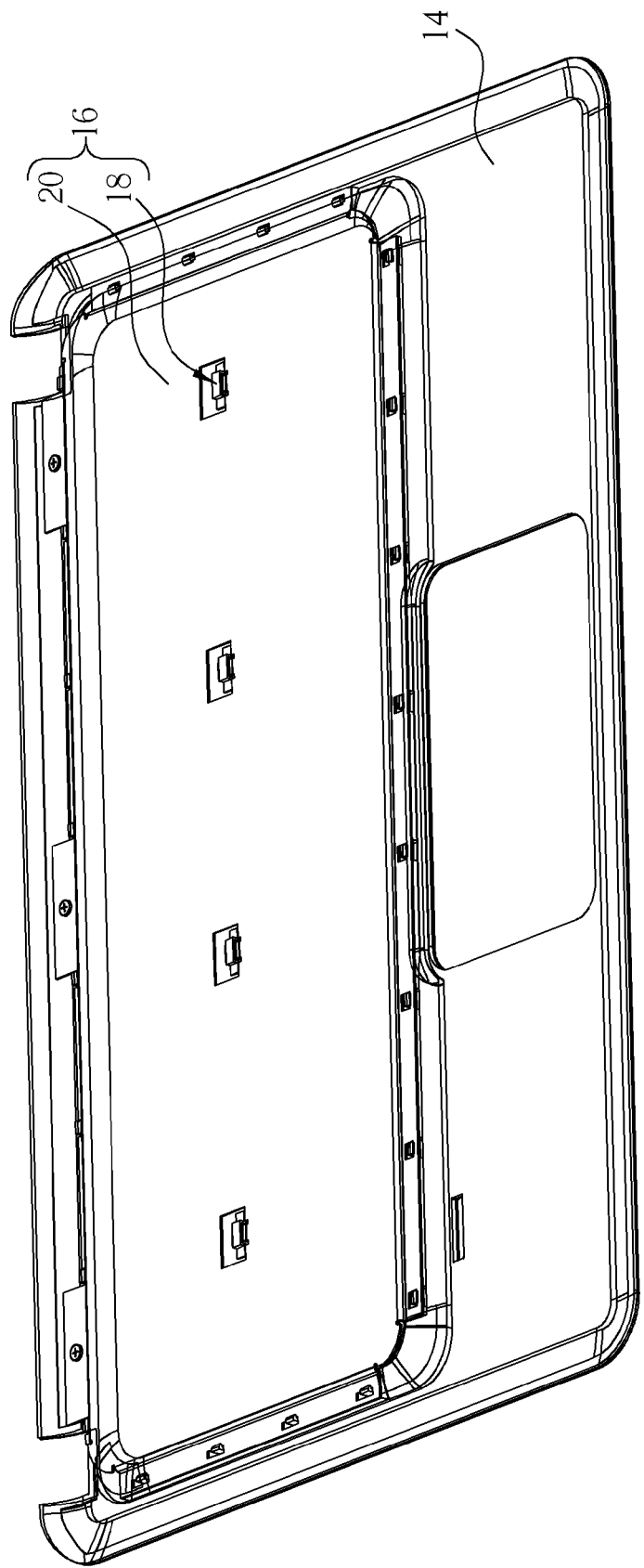
FIG. 5 is an assembly diagram of the support frame in FIG. 4 being installed on the case.

Next, please refer to FIG. 4 and FIG. 5. FIG. 4 is an exploded diagram of the support frame 20 installed with the keyboard 18 in FIG. 3 and the case 14. FIG. 5 is an assembly diagram of the support frame 20 in FIG. 4 being installed on the case 14. After disposing the keyboard 18 on the support frame 20 to finish the assembly process of the keyboard mechanism 16, the keyboard mechanism 16 can be installed on the case 14 along −Z-axis from the back side of the case (as shown in FIG. 4). At this time, motion of the keyboard 18 toward −Y-axis can be further constrained by assembly of the case 14 and the keyboard 18. Subsequently, the support frame 20 can be fixed to the case 14 by engagement of engaging holes 28 formed on the outer edge of the support frame 20 and hooks 30 on the case 14 and locking of screws (not shown in FIG. 5) in screw holes 32 formed on the outer edge of the support frame 20. In such a manner, the keyboard mechanism 16 can be fixed to the case 14 firmly (as shown in FIG. 5). In other words, the portable electronic device 10 can utilize engagement of the first engaging part 24 and the second engaging part 22, assembly of the support frame 20 and the case 14, and tightly-fit of the keyboard 18 and the case 14 to constrain motion of the keyboard 18 toward ±X-axis, ±Y-axis, and ±Z-axis and fix the keyboard mechanism 16 to the case 14.

Finally, after fixing the keyboard mechanism 16 to the case 14 as shown in FIG. 5 and then assembling the case 14 to the main body 12, the assembly process of the portable electronic device 10 can be finished accordingly.

It should be mentioned that assembly of the support frame 20 and the case 14 is not limited to the said embodiment. That is to say, it can also utilize another assembly method commonly seen in the prior art instead, such as a fusion-bonding method. Furthermore, the engaging holes 28 and the screw holes 32 located at the outer edge of the support frame 20 are omissible structures. For example, the outer edge of the support frame 20 may only have the engaging holes 28 formed thereon so that the support frame 20 is connected to the case 14 only by engagement of the engaging holes 28 and the hooks 30 of the case 14, or may only have the screw holes 32 formed thereon so that the support frame 20 is connected to the case 14 only by a screw-locking method.

Furthermore, the structural design of the first engaging part 24 is not limited to the protruding hollow structure as shown in FIG. 2. That is, other structure capable of constraining motion of the keyboard 18 while engaging with the second engaging part 22 may also be applied for the first engaging part 24, such as an extending arm structure or a hollow pad structure.

Figure 6:
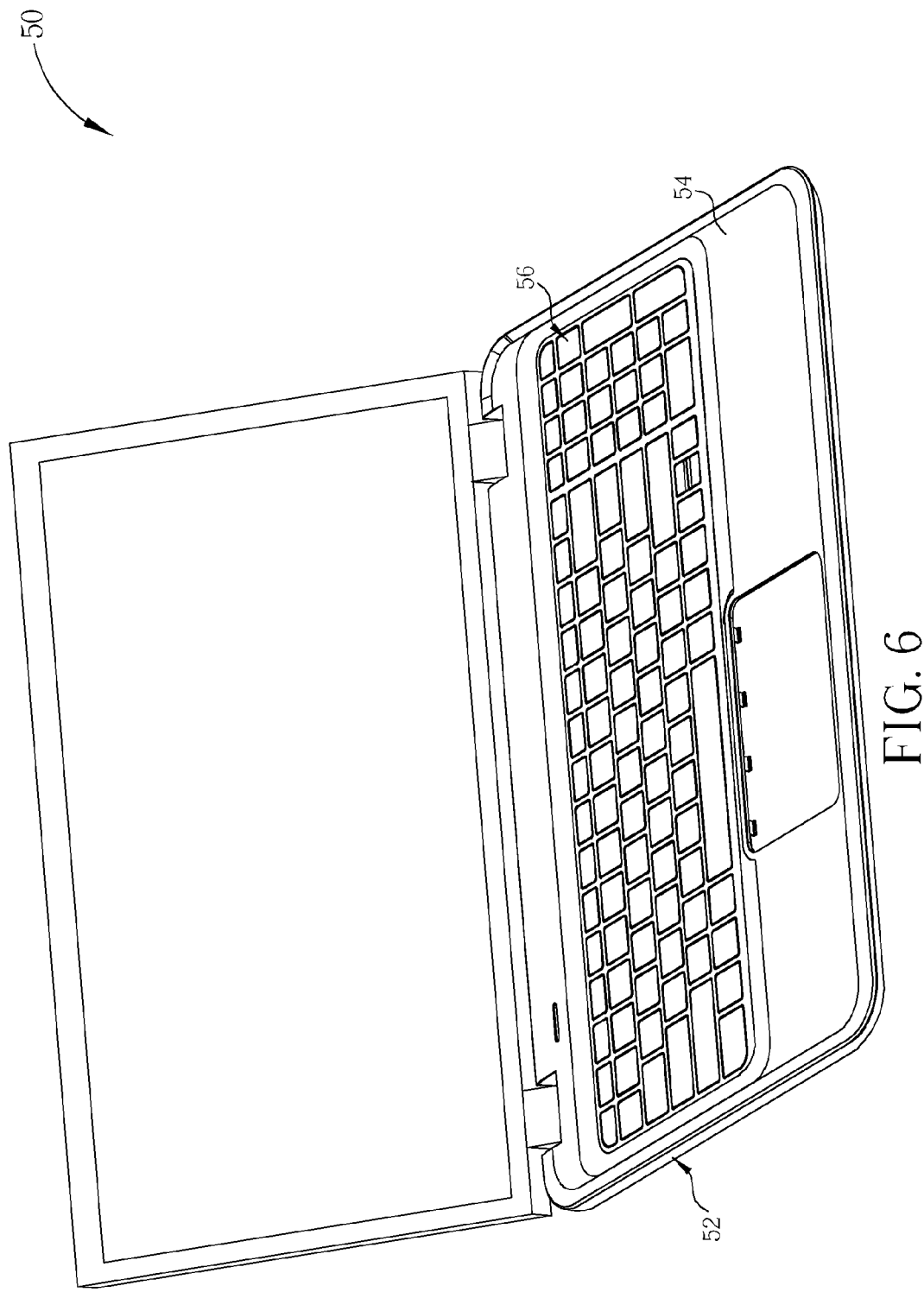
FIG. 6 is a diagram of a portable electronic device according to a second embodiment of the present invention.
Figure 7:
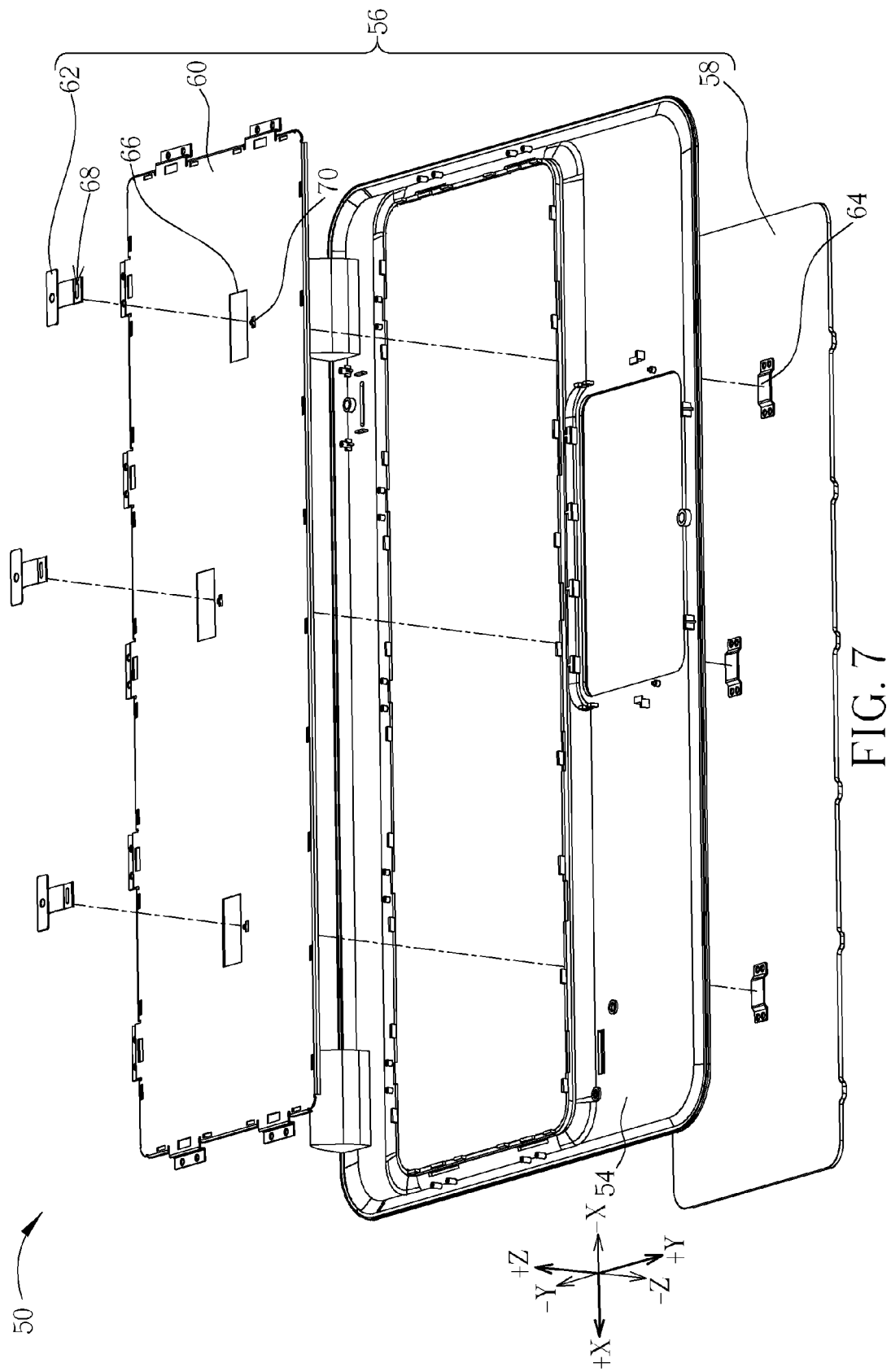
FIG. 7 is a partial exploded diagram of the portable electronic device in FIG. 6.

Next, please refer to FIG. 6, which is a diagram of a portable electronic device 50 according to a second embodiment of the present invention. A major difference between the portable electronic device 50 and the portable electronic device 10 in FIG. 1 is design of engaging part. Similarly, the portable electronic device 50 may preferably be a notebook, but is not limited thereto. In other words, the portable electronic device 50 may also be other electronic device with a built-in keyboard, such as a PDA, or a smart phone. As shown in FIG. 6, the portable electronic device 50 includes a main body 52, a case 54, and a keyboard mechanism 56. The main body 52 may be other components besides the case 54 and the keyboard 56 on the portable electronic device 50, such as a motherboard, and a monitor. The case 54 is installed on the main body 52. The keyboard mechanism 56 is installed on the case 54. Next, please refer to FIG. 7, which is a partial exploded diagram of the portable electronic device 50 in FIG. 6. As shown in FIG. 7, the keyboard mechanism 56 includes a keyboard 58, a support frame 60, at least one second engaging part 62 (three shown in FIG. 7), and at least one engaging part 64 (three shown in FIG. 7). In this embodiment, the second engaging part 62 is an independently-formed component. The first engaging part 64 is disposed on the bottom of the keyboard 58. In this embodiment, the first engaging part 64 is preferably a protruding hollow structure. The support frame 60 is installed on the case 54 and is preferably made of metal material. The support frame 60 is used for supporting the keyboard 58 on the case 54. At least one opening 66 (three shown in FIG. 7) is formed on the support frame 60. The opening 66 is disposed at a position on the support frame 60 corresponding to the first engaging part 64. The second engaging part 62 is preferably a T-shaped engaging part, which has an engaging hole 68 formed thereon. A protruding portion 70 is formed at a side of the opening 66 of the support frame 60. The engaging hole 68 is engaged with the protruding portion 70 when the second engaging part 62 is engaged with the first engaging part 64. Similarly, number and arrangement of the first engaging parts 64, the second engaging parts 62, and the openings 66 as shown in FIG. 7 may vary with manufacturing needs of the keyboard mechanism 56. Furthermore, besides being formed integrally with the keyboard 58, the first engaging part 64 may also be an independently-formed component which can be detachably disposed on the bottom of the keyboard 58 by a common connection method (i.e. a screw-locking method).

Figure 8:
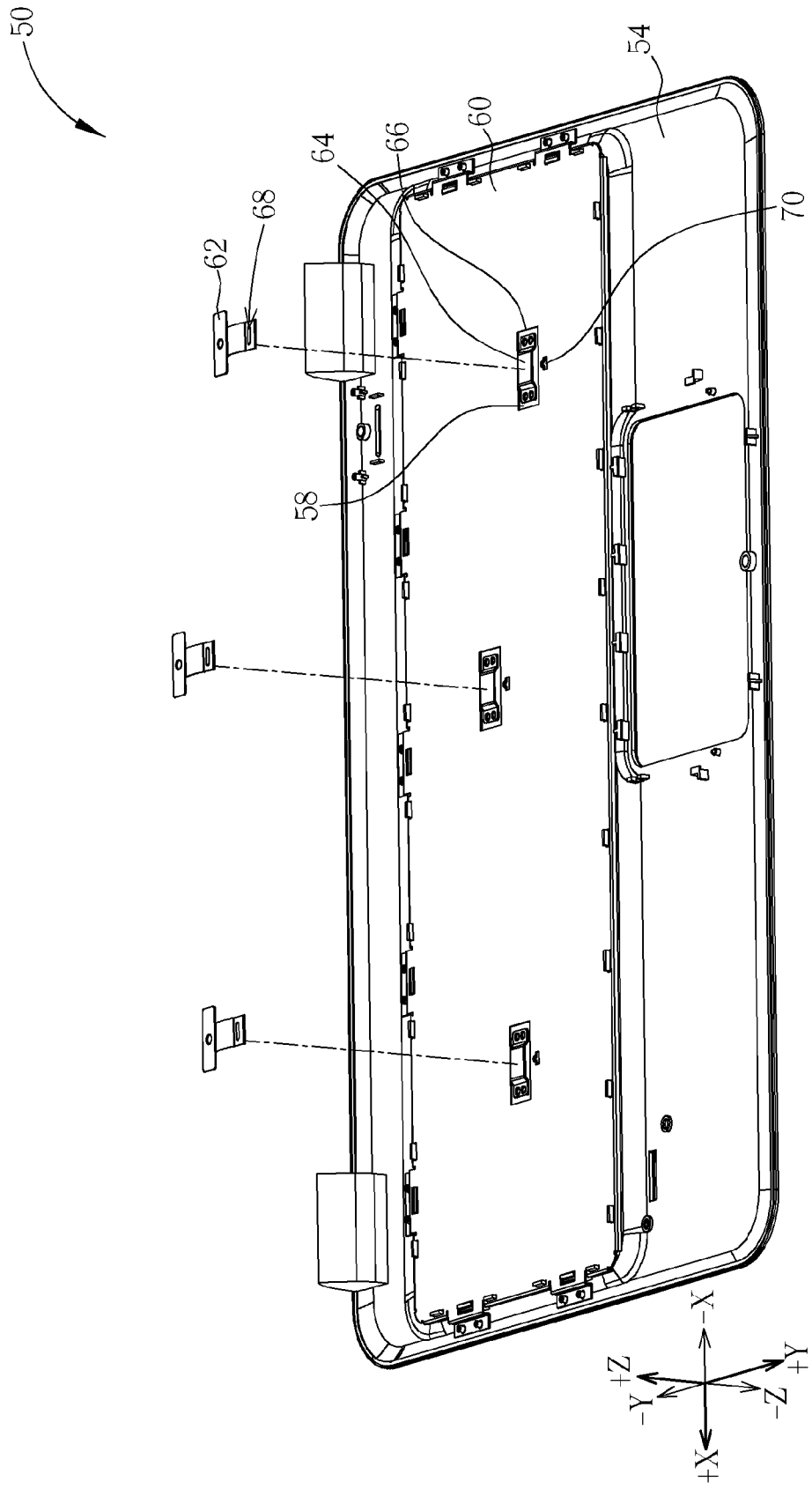
FIG. 8 is an assembly diagram of a keyboard in FIG. 7 being installed on a support frame.

More detailed description for assembly of the portable electronic device 50 is provided as follows. Please refer to FIG. 7 and FIG. 8. FIG. 8 is an assembly diagram of the keyboard 58 in FIG. 7 being installed on the support frame 60. The first step is to utilize engaging holes and screw holes formed on the outer edge of the support frame 60 to fix the support frame 60 to the case 54 from the back side of the case 54 (as shown in FIG. 8). The subsequent step is to align the first engaging part 64 disposed on the keyboard 58 as shown in FIG. 7 with the opening 66 on the support frame 60 and then dispose the first engaging part 64 inside the opening 66 (as shown in FIG. 8). At this time, motion of the keyboard 58 toward ±X-axis, ±Y-axis, and +Z-axis is constrained by the case 54 and the support frame 60.

It should be mentioned that the support frame 60 may also be connected to the case 54 by a conventional fusion-bonding method or an integrally-forming method instead. As far as the integrally-forming method is concerned, the first step is to form the support frame 60 integrally with the case 54 and then form a recess on the case 54 by a mechanical machining method for containing the keyboard 58. In such a manner, the step of assembling the support frame 60 to the case 54 can be therefore omitted, so as to reduce time needed for the assembly process of the portable electronic device 50 and simplify the manufacturing process of the portable electronic device 50.

Figure 9:
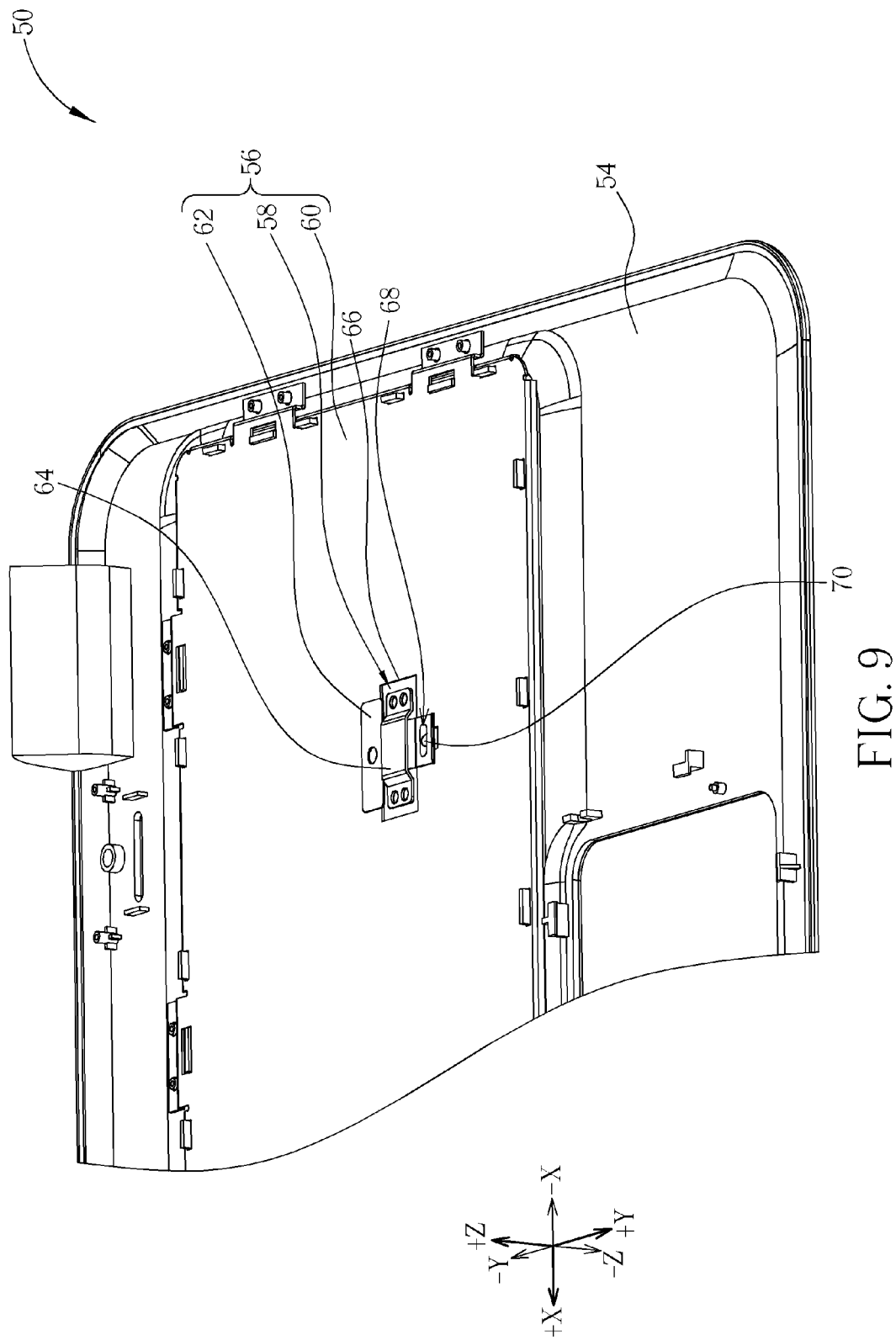
FIG. 9 is an assembly diagram of a second engaging part in FIG. 8 being engaged with the first engaging part.

Next, please refer to FIG. 9, which is an assembly diagram of the second engaging part 62 in FIG. 8 being engaged with the first engaging part 64. After disposing the first engaging part 64 of the keyboard 58 inside the opening 66 of the support frame 60, the subsequent step is to dispose the second engaging part 62 through the hollow structure of the first engaging part 64 and then engage the engaging hole 68 of the second engaging part 62 with the protruding portion 70. In such a manner, the keyboard 58 can be fixed to the case 54 and the support frame 60. At this time, motion of the keyboard 58 toward −Z-axis can be constrained by the support frame 60. In summary, the portable electronic device 50 can utilize engagement of the first engaging part 64 and the second engaging part 62, assembly of the support frame 60 and the case 54, and tightly-fit of the keyboard 58 and the case 54 to constrain motion of the keyboard 58 toward ±X-axis, ±Y-axis, and ±Z-axis and fix the keyboard mechanism 56 to the case 54.

Finally, after fixing the keyboard mechanism 56 to the case 54 and assembling the case 54 to the main body 52, the assembly process of the portable electronic device 50 can be finished accordingly (as shown in FIG. 6). Furthermore, all the structural design mentioned in the first embodiment can be applied for the second embodiment, such as connection of the support frame 20 and the case 14, or the structural design of the first engaging part 24. Similarly, all the structural design mentioned in the second embodiment can also be applied for the first embodiment. For example, besides being formed extensively in the opening 26 of the support frame 20, the second engaging part 22 may also be an independently-formed component which can be detachably disposed on the support frame 20, like the second engaging part 62 as shown in FIG. 7. That is to say, if the second engaging part 22 is an independently-formed component, the second engaging part 22 can still fix the keyboard 18 to the case 14 and the support frame 20 according to the assembly process mentioned in the second embodiment.

Compared with the prior art, in which screw bosses formed on a keyboard are utilized to fix and support the keyboard on a portable electronic device, the present invention involves utilizing engagement of the keyboard and the support frame instead to prevent a time-consuming and strenuous assembly process and provide the keyboard with steady support. Thus, the present invention may not only solve the aforementioned keyboard-floating problem by the support frame, but may also reduce the manufacturing cost of the keyboard and increase flexibility of the keyboard in use by the simple structural designs mentioned in the said embodiments.

Those skilled in the art will readily observe that numerous modifications and alterations of the device and method may be made while retaining the teachings of the invention.

What is claimed is:

1. A keyboard mechanism for a portable electronic device, the keyboard mechanism comprising:
    a keyboard;
    a first engaging part disposed on the keyboard and having a hollow structure;
    a support frame installed on a case of the portable electronic device for supporting the keyboard on the case of the portable electronic device, an opening being located at a position on the support frame corresponding to the first engaging part; and
    a second engaging part separating from the support frame and being a T-shaped part, an engaging hole being formed on the second engaging part, a protruding portion being formed on a side of the opening of the support frame, the protruding portion being used for penetrating through the engaging hole so as to install the keyboard on the support frame when the hollow structure passes through the opening of the support frame along an assembly direction and protrudes outwardly from the opening of the support frame and the second engaging part linearly penetrates through the hollow structure of the first engaging part along an insertion direction perpendicular to the assembly direction.

2. The keyboard mechanism of claim 1, wherein the first engaging part is a protruding hollow structure.

3. The keyboard mechanism of claim 1, wherein the first engaging part is a protruding arm structure.

4. The keyboard mechanism of claim 1, wherein the first engaging part is detachably disposed on the keyboard.

5. The keyboard mechanism of claim 4, wherein the first engaging part is connected to the keyboard in a screw-locking manner.

6. The keyboard mechanism of claim 1, wherein the first engaging part is integrally formed with the keyboard.

7. The keyboard mechanism of claim 1, wherein the support frame is connected to the case in a screw-locking manner.

8. The keyboard mechanism of claim 1, wherein the support frame is engaged with the case.

9. A portable electronic device capable of supporting a keyboard, the portable electronic device comprising:
    a main body;
    a case disposed on the main body; and
    a keyboard mechanism installed on the case, the keyboard mechanism comprising:
        a keyboard;
        a first engaging part disposed on the keyboard and having a hollow structure;
        a support frame installed on a case of the portable electronic device for supporting the keyboard on the case of the portable electronic device, an opening being located at a position on the support frame corresponding to the first engaging part; and
        a second engaging part separating from the support frame and being a T-shaped part, an engaging hole being formed on the second engaging part, a protruding portion being formed on a side of the opening of the support frame, the protruding portion being used for penetrating through the engaging hole so as to install the keyboard on the support frame when the hollow structure passes through the opening of the support frame along an assembly direction and protrudes outwardly from the opening of the support frame and the second engaging part linearly penetrates through the hollow structure of the first engaging part along an insertion direction perpendicular to the assembly direction.

10. The portable electronic device of claim 9, wherein the first engaging part is a protruding hollow structure.

11. The portable electronic device of claim 9, wherein the first engaging part is a protruding arm structure.

12. The portable electronic device of claim 9, wherein the first engaging part is detachably disposed on the keyboard.

13. The portable electronic device of claim 12, wherein the first engaging part is connected to the keyboard in a screw-locking manner.

14. The portable electronic device of claim 9, wherein the first engaging part is integrally formed with the keyboard.

15. The portable electronic device of claim 9, wherein the support frame is connected to the case in a screw-locking manner.

16. The portable electronic device of claim 9, wherein the support frame is engaged with the case.

* * * * *